(12) United States Patent
Lin et al.

(10) Patent No.: US 8,275,218 B2
(45) Date of Patent: Sep. 25, 2012

(54) FORWARD AND BACKWARD IMAGE RESIZING METHOD

(75) Inventors: Shih-Hsiang Lin, Taoyuan County (TW); Pei-Chi Hsiao, Taoyuan County (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 431 days.

(21) Appl. No.: 12/724,105

(22) Filed: Mar. 15, 2010

(65) Prior Publication Data

US 2011/0129164 A1 Jun. 2, 2011

(30) Foreign Application Priority Data

Dec. 2, 2009 (TW) ................................ 98141144 A (51) Int. Cl.
*G06K 9/32* (2006.01)
*G06K 15/02* (2006.01)
*G09G 5/00* (2006.01)
(52) U.S. Cl. ........................ 382/299; 358/1.2; 345/660
(58) Field of Classification Search ................ 382/254, 382/260, 275, 298–300, 305, 312; 358/1.2, 358/3.27, 525, 528; 348/240.99; 345/606, 345/660, 670, 671
See application file for complete search history.

(56) References Cited

U.S. PATENT DOCUMENTS

| | | | | |
|---|---|---|---|---|
| 6,018,597 A | * | 1/2000 | Maltsev et al. | ............... 382/260 |
| 7,092,020 B2 | * | 8/2006 | Yoshikawa | .................... 348/280 |
| 7,142,729 B2 | * | 11/2006 | Wredenhagen et al. | ...... 382/300 |
| 7,379,612 B2 | * | 5/2008 | Milanfar et al. | ............... 382/254 |
| 7,843,509 B2 | * | 11/2010 | Hahn et al. | .................... 348/448 |
| 7,986,858 B2 | * | 7/2011 | Matsumoto et al. | .......... 382/298 |
| 8,014,632 B2 | * | 9/2011 | Matsumoto et al. | .......... 382/299 |

* cited by examiner

*Primary Examiner* — Kanjibhai Patel
(74) *Attorney, Agent, or Firm* — Rabin & Berdo, P.C.

(57) ABSTRACT

A forward and backward image resizing method is used for resizing a low-resolution image into a high-resolution image. In the method, the low-resolution image is obtained first, and then a forward and backward image resizing process is performed, so as to resize the low-resolution image into the high-resolution image with an integral multiple resolution. The forward and backward image resizing process includes: resizing the low-resolution image by the integral multiple, so as to generate a first-resizing image with the integral multiple resolution; further increasing the resolution of the first-resizing image by 2-fold, so as to generate a second-resizing image; and reducing the resolution of the second-resizing image by 2-fold, thereby obtaining the high-resolution image.

12 Claims, 14 Drawing Sheets

$$Xi(i,j) = \begin{array}{|c|c|c|c|c|c|c|c|} \hline n & n & n & n & n & n & n & n \\ \hline n & n & n & n & n & n & n & n \\ \hline n & n & n & n & n & n & n & n \\ \hline n & n & n & n & n & n & n & n \\ \hline n & n & n & n & n & n & n & n \\ \hline n & n & n & n & n & n & n & n \\ \hline n & n & n & n & n & n & n & n \\ \hline n & n & n & n & n & n & n & n \\ \hline \end{array}$$

$$R(i, j) = \begin{array}{|c|c|c|c|c|c|c|c|c|c|c|c|c|c|} \hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline a&a&a&a&a&a&a&a&a&a&a&a&a&a\\\hline \end{array}$$

| w | w | w | w | w | w | w | w | w | w | w | w | w | w | w |
|---|---|---|---|---|---|---|---|---|---|---|---|---|---|---|
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |
| w | w | w | w | w | w | w | w | w | w | w | w | w | w | w |

| h | h | h | h | h | h | h | h | h | h | h | h | h | h | h |
|---|---|---|---|---|---|---|---|---|---|---|---|---|---|---|
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |
| h | h | h | h | h | h | h | h | h | h | h | h | h | h | h |

FORWARD AND BACKWARD IMAGE RESIZING METHOD

CROSS-REFERENCES TO RELATED APPLICATIONS

This non-provisional application claims priority under 35 U.S.C. §119(a) on Patent Application No. 98141144 filed in Taiwan, R.O.C. on Feb. 12, 2009, the entire contents of which are hereby incorporated by reference.

BACKGROUND OF THE INVENTION

1. Technical Field

The present invention relates to resizing an image into a high-resolution image, and more particularly to a forward and backward image resizing method for resizing an image twice and then reducing the resolution of the image to form a high-resolution image to be output.

2. Related Art

In many special environments, it is not easy to obtain a high-resolution image. For example, images obtained by low-resolution image capturing apparatus (resolution capability ranging from hundreds of thousands of pixels to millions of pixels), such as common web cameras, surveillance cameras, and the built-in cameras of low-end mobile phones, are often indistinct. In addition, network bandwidth limitations have the effect that when video information is played back as streaming media, the transmission of high-resolution image frames occupies the bandwidth of the internet transmission, resulting in low FPS (Frames Per Second); the video information is therefore generally transmitted in the format of low-resolution image frames. Moreover, as display sizes continue to increase, when the images are displayed on a large-sized display in a full-screen mode, the images become too blurred to view distinctly.

In view of these problems, many methods have been derived from image processing technologies, in which the low-resolution images are resized into a high-resolution image according to information contained therein, such that the resized images are not blurred.

In the prior art, common image resolution enhancement methods mainly include an interpolation method. In the interpolation method, the original image is resized into a high-resolution image by following steps. The first step is that known pixels are filled in values directly, and unknown pixels between the known pixels are reserved as blank pixels; next, the unknown pixels are predicted by combining the neighboring known pixels in different ways, and sequentially filled into the blank pixel blocks. The interpolation method has the advantage of high operational speed, but always causes over-smoothing, and produces a blurred visual appearance.

In addition to the interpolation method, the common image resolution enhancement methods also include an inverse image modeling method and a training method.

In the inverse image modeling method, it is assumed that the generation of a low-resolution image is a series of image processing procedures. In other words, it is assumed that a known low-resolution image is generated from a high-resolution image by blurring, down-sampling, noise reduction, and other processes, so that a generation model for the low-resolution image can be established to convert the high-resolution image into the known low-resolution image. In the inverse image modeling method, an inverse generation model for resizing the low-resolution image into the high-resolution image is further established inversely according to the generation model for the low-resolution image, so as to estimate an unknown fuzzy filter to restore the original high-resolution image. The inverse image modeling method is characterized by a sharp presentation at the image edges; however, since the inverse generation model aims to obtain an optimal solution and requires multiple iterations, the operation time is long and required computational effort is high.

The training method is to collect a large number of corresponding low-resolution and high-resolution training images, memorize and train a corresponding relation between each low-resolution local texture and each high-resolution local texture, and use the relation to construct a database.

When a low-resolution non-training image is processed by the training method, in the first step the image is divided into many blocks, and the database is searched for low-resolution training blocks having the most similar texture features to each block; and then corresponding high-resolution blocks are found, so as to construct a high-resolution image. In the training method the prediction is based on real images, so the visual perception of the output result is natural; however, in different situations the presentation is largely dependent on the database, and the database training and searching processes require a long time.

Moreover, the image resolution enhancement methods in the prior art are applied to undistorted images, and are scarcely applied to distorted images. As the size of the display continuously increases, when images in the conventional streaming media format are displayed in a full-screen mode, blurring occurs. The most serious problem encountered when common algorithms are applied to distorted images is that noise and defects are also enlarged. However, if noise and defect filtering is performed prior to the resolution enhancement process, details in the low-resolution image will be lost, and an over-smoothing effect is observed after enlargement, thereby reducing the effect of resolution enhancement.

SUMMARY

The image resolution enhancement methods in the prior art cannot filter out noise and defects, or require a high computational effort, and thus cannot be applied to streaming media for real-time playback.

In view of the above problems, the present invention is directed to a forward and backward image resizing method, which requires relatively low computational effort, and can alleviate the problem of noise or defects in the original image.

The forward and backward image resizing method of the present invention is used for resizing a low-resolution image into a high-resolution image. In the method, the low-resolution image is obtained at first, and then a forward and backward image resizing process is performed, so as to resize the low-resolution image into a high-resolution image having an integral-multiple resolution.

The forward and backward image resizing process includes: increasing the resolution of the low-resolution image by the integral multiple, so as to generate a first-resizing image having the integral-multiple resolution; further increasing the resolution of the first-resizing image by 2-fold, so as to generate a second-resizing image; and reducing the resolution of the second-resizing image by 2-fold, thereby forming the high-resolution image.

In the present invention, the low-resolution image is resized twice, so as to achieve a resolution higher than an expected high-resolution image, thereby generating more details; and then the resolution of the over-resized image is reduced into the expected high-resolution image to be output. In the two resizing processes and the reduction process, noise in the image is removed while maintaining edge structure; the present invention is thus able to provide good image quality. Moreover, since the present invention only requires a low computational effort, the image resizing method of the present invention can be combined with streaming media player, such that upon receiving consecutive image frames transmitted as streaming media, each image frame is processed in real time and then output, thereby improving the quality of streaming media.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
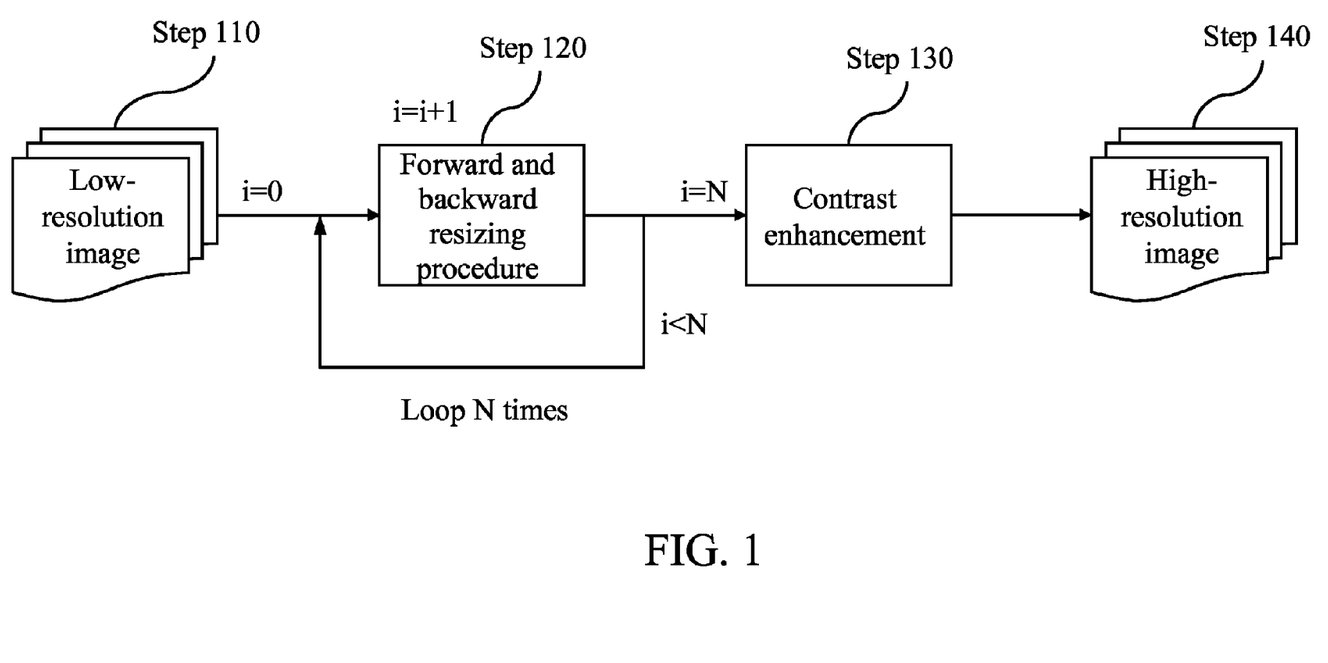
FIG. 1 is a flow chart of a forward and backward image resizing method according to the present invention.
Figure 2:
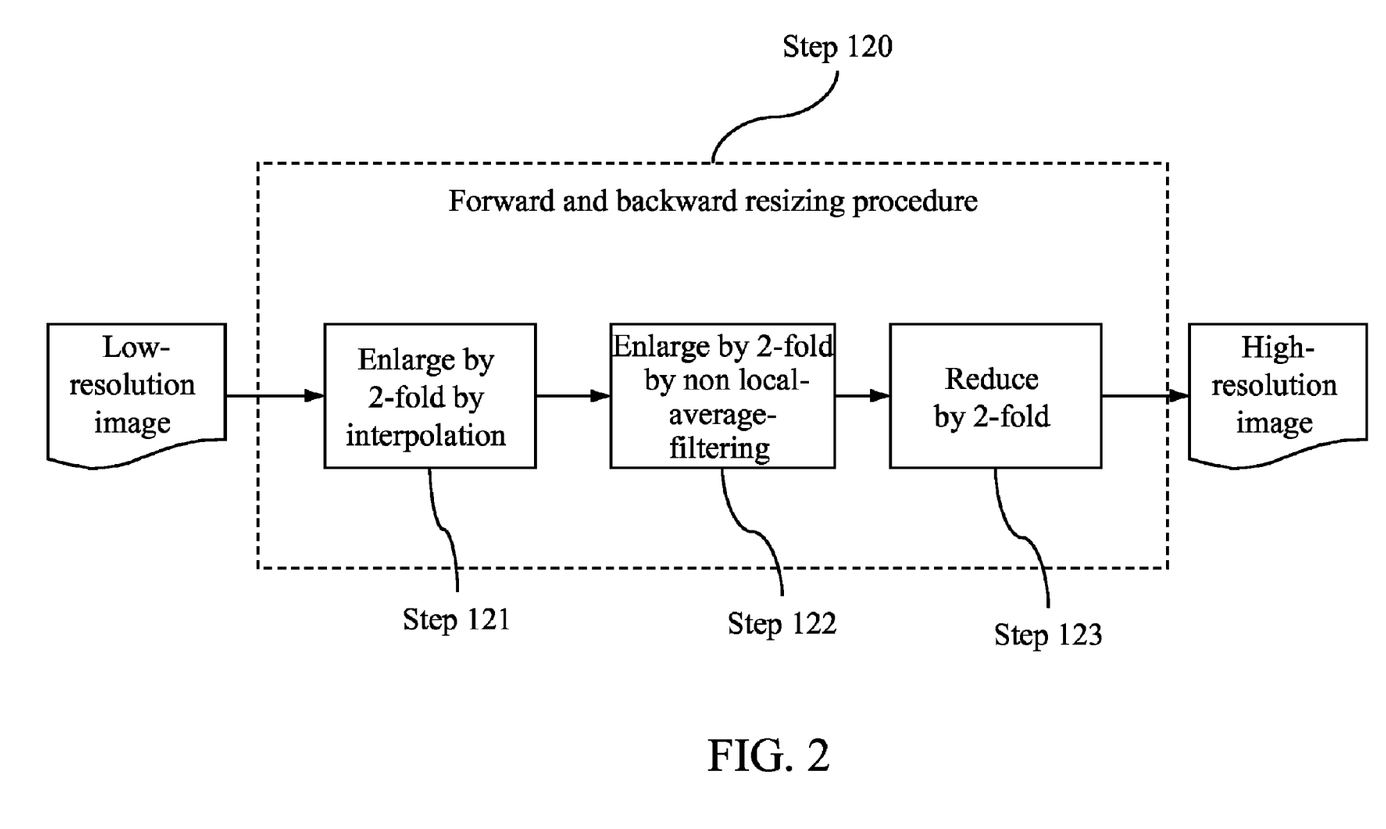
FIG. 2 is a flow chart of a forward and backward image resizing process according to the present invention.

FIGS. 1 and 2 are flow charts of a forward and backward image resizing method according to an embodiment of the present invention.

Referring to FIG. 1, in which the forward and backward image resizing method of the present invention is used for resizing a low-resolution image into a high-resolution image. The phrase "increasing the resolution by N-fold" described below refers to enhancement of the resolution, rather than increase in the size of the output image. The expression "increasing the resolution by N-fold" refers to the fact that for the resolution of the image in an X-Y two-dimensional plane, numbers of pixels in both the X axis and the Y axis are increased by N-fold, that is, the total number of pixels is increased by $N^2$-fold.

Referring to FIG. 2, in the forward and backward image resizing method, the first step is that a low-resolution image is obtained, and then the low-resolution image is input into a conversion module (Step 110). The conversion module may be a data processing apparatus installed with conversion software. The conversion software may be software configured to run independently to process single or consecutive low-resolution images; alternatively, the conversion software may be integrated with another image-media playback software, such that after the low-resolution image is resized into a high-resolution image, the image-media playback software plays back the high-resolution image obtained by resizing the low-resolution image.

Referring to FIG. 1 again, the conversion module then performs a forward and backward image resizing process, so as to resize the low-resolution image into a high-resolution image having a 2-fold resolution (Step 120).

When the low-resolution image is required to be resized by $2^N$-fold, the forward and backward image resizing process is repeatedly performed for N times. When the image is resized by $2^N$-fold, each time the conversion module receives the low-resolution image, the conversion module resets a count value i to zero (i=0). Next, each time the forward and backward image resizing process is completed, the conversion module adds 1 to the count value i (i=i+1), and then compares whether i is equaled to N (i=N). If i=N, it indicates that forward and backward image resizing has been performed for N times, and a next step is performed; and if i<N, the forward and backward image resizing process is required to be performed one more time. It should be noted that the above loop of repeatedly performing forward and backward image resizing for N times is merely provided as an example, and the loop of repeatedly performing forward and backward image resizing process for N times of the present invention is not limited to these steps. The conversion module may also preset the count value to N, and subtracts 1 from N (N=N−1) each time the forward and backward image resizing process is completed, and the next step is performed if N=0.

When the image is required to be resized by $2^N$-fold, the conversion module performs the forward and backward image resizing process for N times, so as to gradually resizing the low-resolution image into a high-resolution image having an expected-fold resolution, so the process for performing the forward and backward image resizing process for N times may be referred to as a progressive forward and backward image resizing method.

Referring to FIG. 1, the conversion module performs contrast enhancement on the high-resolution image (Step 130), and finally outputs the processed high-resolution image (Step 140). Since in the present invention the forward and backward image resizing process has the function of increasing the high-frequency field intensity, the contrast enhancement process (Step 130) may also be omitted.

Referring to FIG. 2, the forward and backward image resizing process (Step 120) is described in detail below.

In the forward and backward image resizing process (Step 120), the conversion module firstly increases the resolution of the low-resolution image by 2-fold by interpolation (Step 121), so as to generate a first-resizing image having the 2-fold resolution. That is, in the X-Y two-dimensional plane, numbers of pixels in the low-resolution image in both the X axis and the Y axis are increased by 2-fold, so as to form the first-resizing image.

The conversion module then further increases the resolution of the first-resizing image by 2-fold by a non local mean filtering enlargement procedure, so as to generate a second-resizing image (Step 122).

Finally, the conversion module reduces the resolution of the second-resizing image by 2-fold by bicubic interpolation, that is, the resolution of the image having been resized twice is reduced to ½ of the original resolution of the second-resizing image (Step 123). The method for reducing the resolution of the second-resizing image by 2-fold is not limited to bicubic interpolation, but may be any method for reducing the resolution, and mainly aims to reduce the resolution of the second-resizing image, such that the ratio at which the image is enlarged returns to 2-fold.

Through the above procedures, the resolution of the original low-resolution image is increased by 2-fold to form a high-resolution image to be output.

Figure 3:
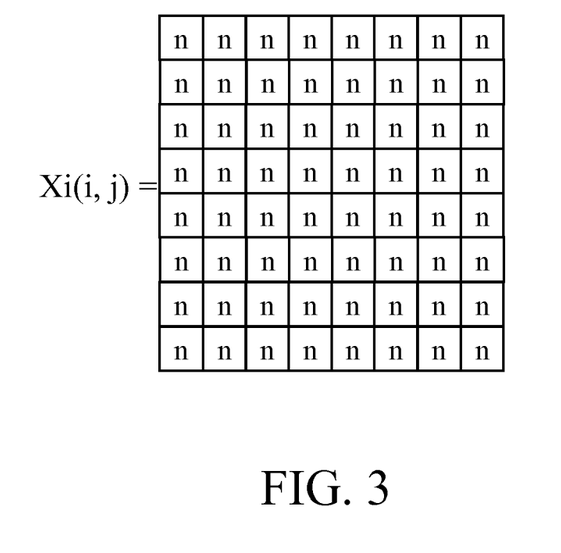
FIG. 3 is a schematic view of an original pixel array of a first-resizing image according to the present invention.

Referring to FIG. 3, in which in the non local mean filtering enlargement procedure, the first-resizing image resized by 2-fold in the previous step is used as an input image. The input image is defined as an original pixel array Xi, as shown in FIG. 3. In FIG. 3, a pixel with a mark "n" indicates that the pixel is an original pixel n of the pixel array Xi.

Figure 4:
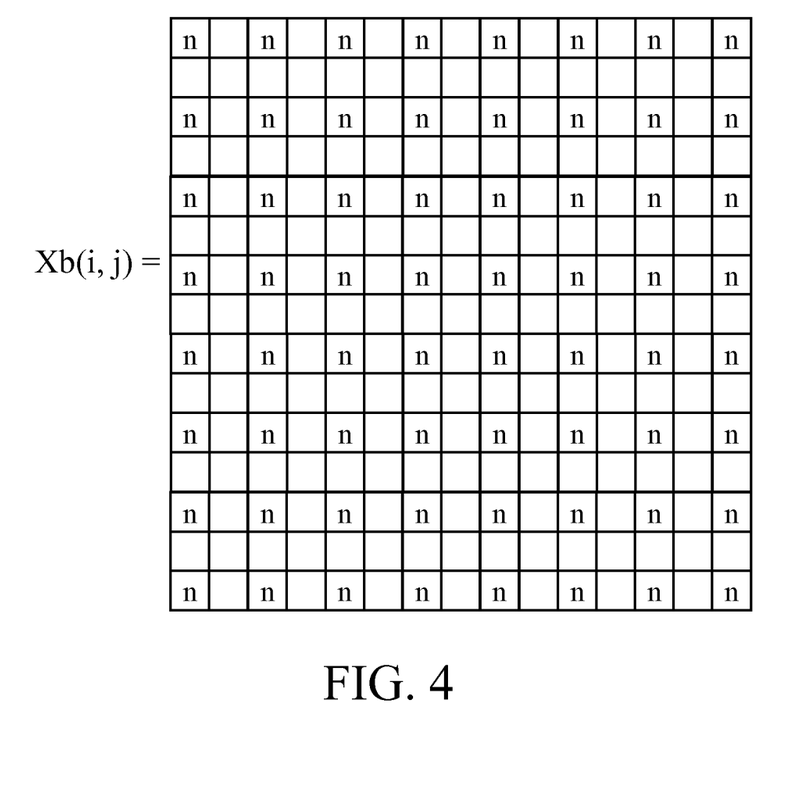
FIG. 4 is a schematic view of an enlarged pixel array obtained by resizing the original pixel array by 2-fold according to the present invention.

Referring to FIG. 4, in which in the non local mean filtering enlargement procedure, the conversion module firstly calculates the original pixel array Xi by bicubic interpolation, so as to obtain an enlarged pixel array Xb enlarged by 2-fold. In FIG. 4, a pixel with a mark "n" indicates that the pixel is an original pixel n from the pixel array Xi, and pixels without the mark "n" are interpolated pixels between the neighboring original pixels n obtained by bicubic interpolation.

Subsequently, the conversion module patches the original pixels to a target pixel array R according to image value differences between the enlarged pixel array Xb and the neighboring original pixels n, so as to obtain the second-resizing image.

The step of patching target pixels a is described below.

The conversion module then establishes a blank target pixel array R and a blank weight array W. The target pixel array R and the weight array W have the same size as the enlarged pixel array Xb or a pixel array of the high-resolution image to be output. As described above, the target pixel array R includes a plurality of target pixels a, and the target pixels a are blank pixels before patching.

Figure 5:
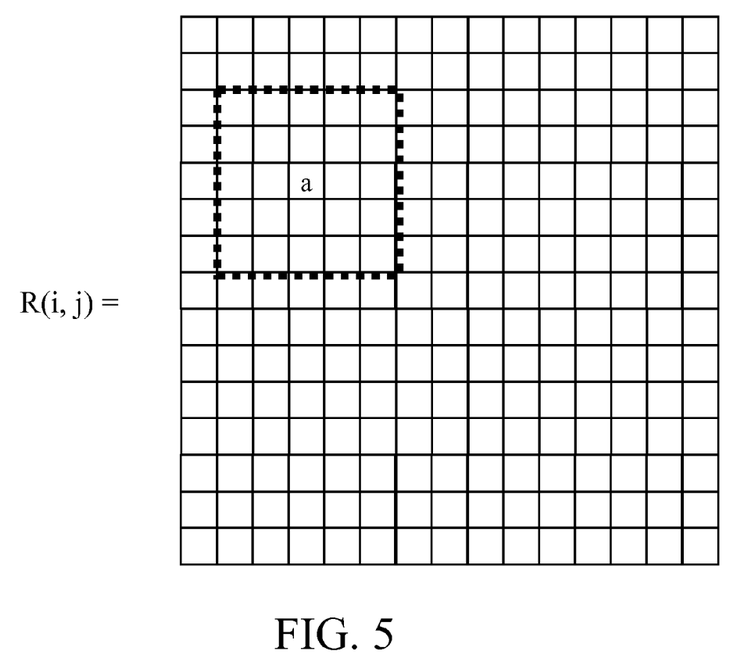
FIG. 5 is a schematic view of a blank target pixel array according to the present invention.

Referring to FIG. 5, in the target pixel array R, the target pixels a not only include pixels of the interpolated pixels, but also include the original pixels n. In other words, a patching operation must be performed for each pixel in the target pixel array R. The conversion module defines a search range for each target pixel, for example, defines the search range as two pixels, such that all pixels spaced from the target pixel a by a distance smaller than two pixels are listed as pixels located within the search range. In FIG. 5, a target pixel a is selected, which is corresponding to an interpolated pixel a' in the enlarged pixel array Xb. In FIG. 5, the target pixel is marked with "a", indicating that the target pixel a is corresponding to the interpolated pixel a' in the enlarged pixel array Xb.

Figure 6:
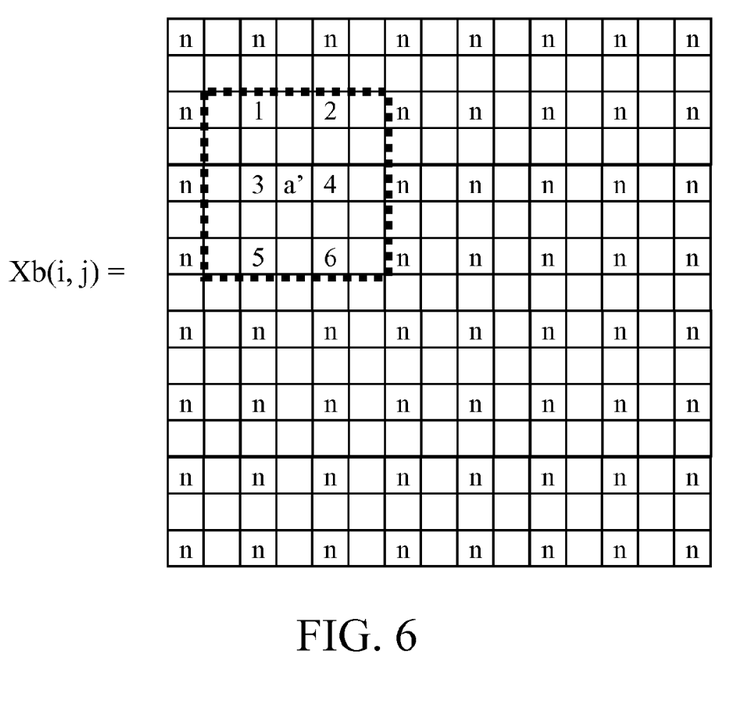
FIG. 6 is a schematic view of the resized pixel array according to the present invention.

Referring to FIG. 6, after selecting a target pixel a to be patched from the target pixel array R, the conversion module finds a specified pixel a' corresponding to the target pixel a from the enlarged pixel array Xb; and the conversion module finds the original pixels n located within the search range, and defines each original pixel n as a neighboring pixel. For ease of understanding, the neighboring pixels in FIG. 6 are respectively marked as neighboring pixels 1-6. According to the target pixel a, the specified pixel a' may be an original pixel n or an interpolated pixel between original pixels.

Referring to FIG. 6, the conversion module then respectively calculates similarities between each of the neighboring pixels 1-6 and the specified pixel a' in the enlarged pixel array Xb. The similarities may be image value differences between each of the neighboring pixels 1-6 and the specified pixel a'. Afterward, the conversion module calculates weight values w1-w6 of the neighboring pixels 1-6 according to the similarities. Each of the weight values w1-w6 is a function of the image value differences.

Figure 7:
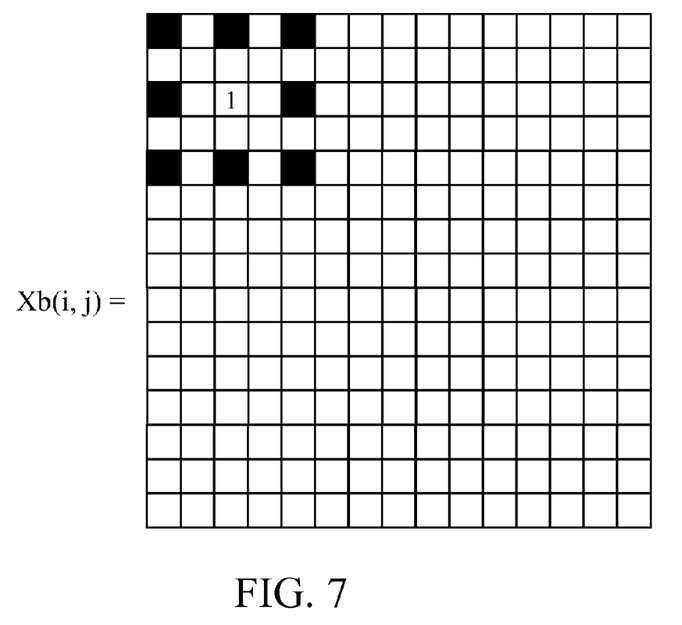
FIG. 7 is a schematic view of defining a patch array in the enlarged pixel array according to the present invention.

Referring to FIG. 7, the conversion module defines a patch array for each neighboring pixel 1-6. The patch array includes one of the neighboring pixels 1-6 in the center and the original pixels n in the enlarged pixel array Xb adjacent to the neighboring pixel 1-6. The adjacent original pixels n are corresponding to the original pixels n in the original pixel array Xi surrounding the neighboring pixel 1-6. In FIG. 7, the neighboring pixel 1 is described as an example.

Figure 8:
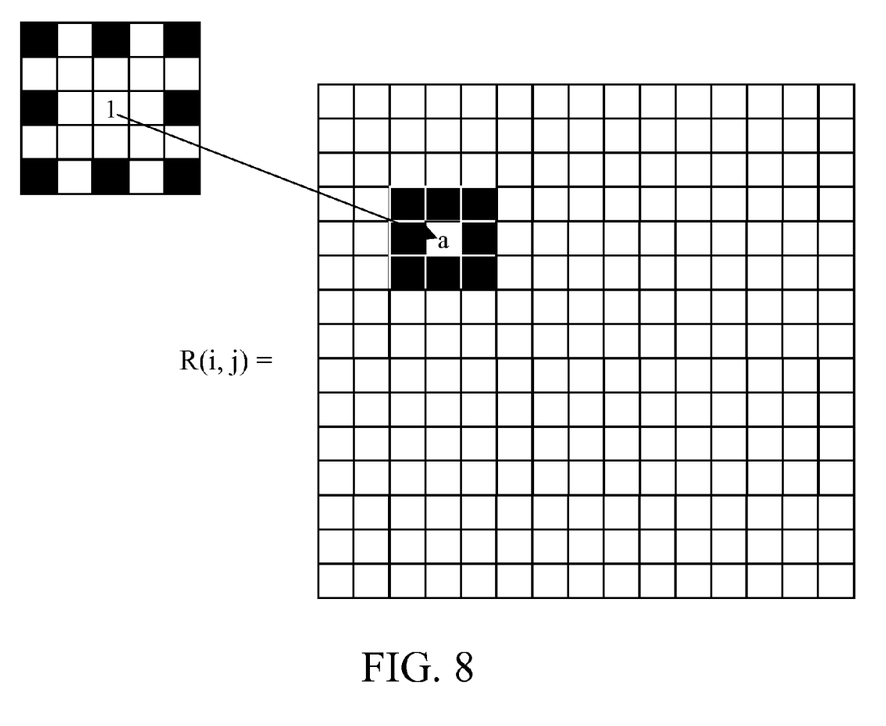
FIG. 8 is a schematic view of patching the patch array to the target pixel array according to the present invention.

Referring to FIG. 8, the patch array is configured to be patched by the conversion module to the target pixel array R in a cumulative manner; however, the patch arrays are not directly patched, but have to be multiplied by the corresponding weight values w1-w6.

Figure 9:
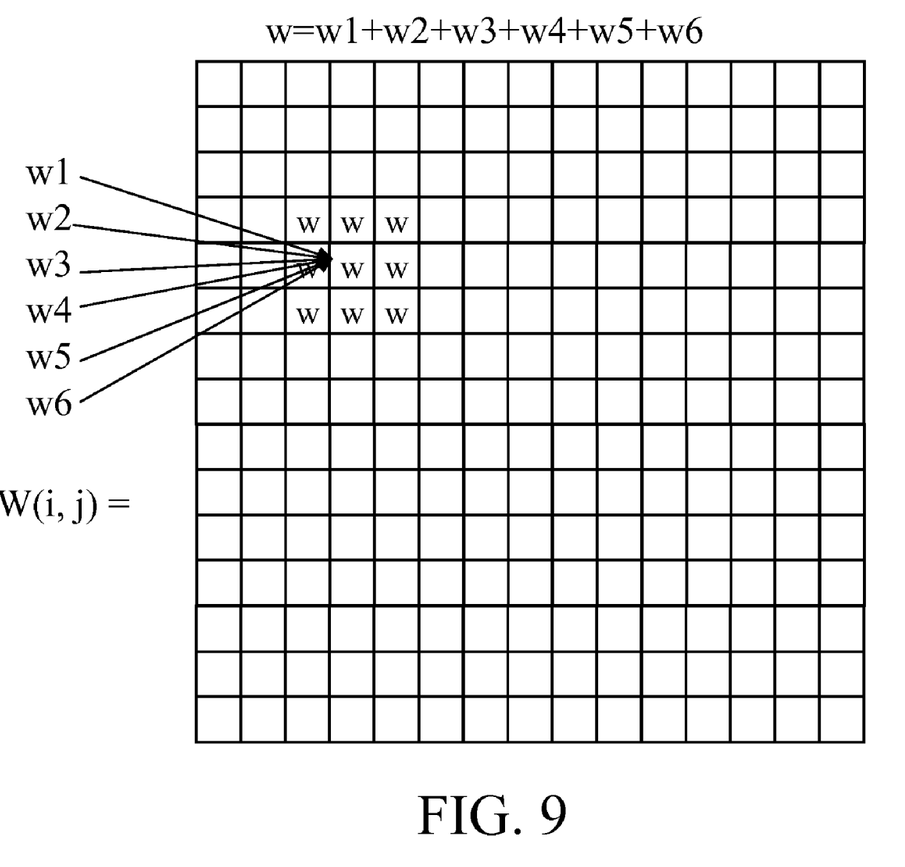
FIG. 9 is a schematic view of patching weight values to a weight array according to the present invention.

Referring to FIG. 9, the conversion module patches the weight values w1-w6 to positions in the weight array W corresponding to and adjacent to the target pixel a in a cumulative manner, that is, a peripheral black area including the target pixel a as shown in FIG. 8. Since the weight values w1-w6 are patched in the cumulative manner, a weight value w=w1+w2+w3+w4+w5+w6 is patched to the target pixel a and pixels adjacent to the target pixel. When another pixel is used as a next specified pixel a' for calculating the weight value, a newly obtained weight value is continuously patched to the pixels having been patched with the weight value in a cumulative manner.

Figure 10:
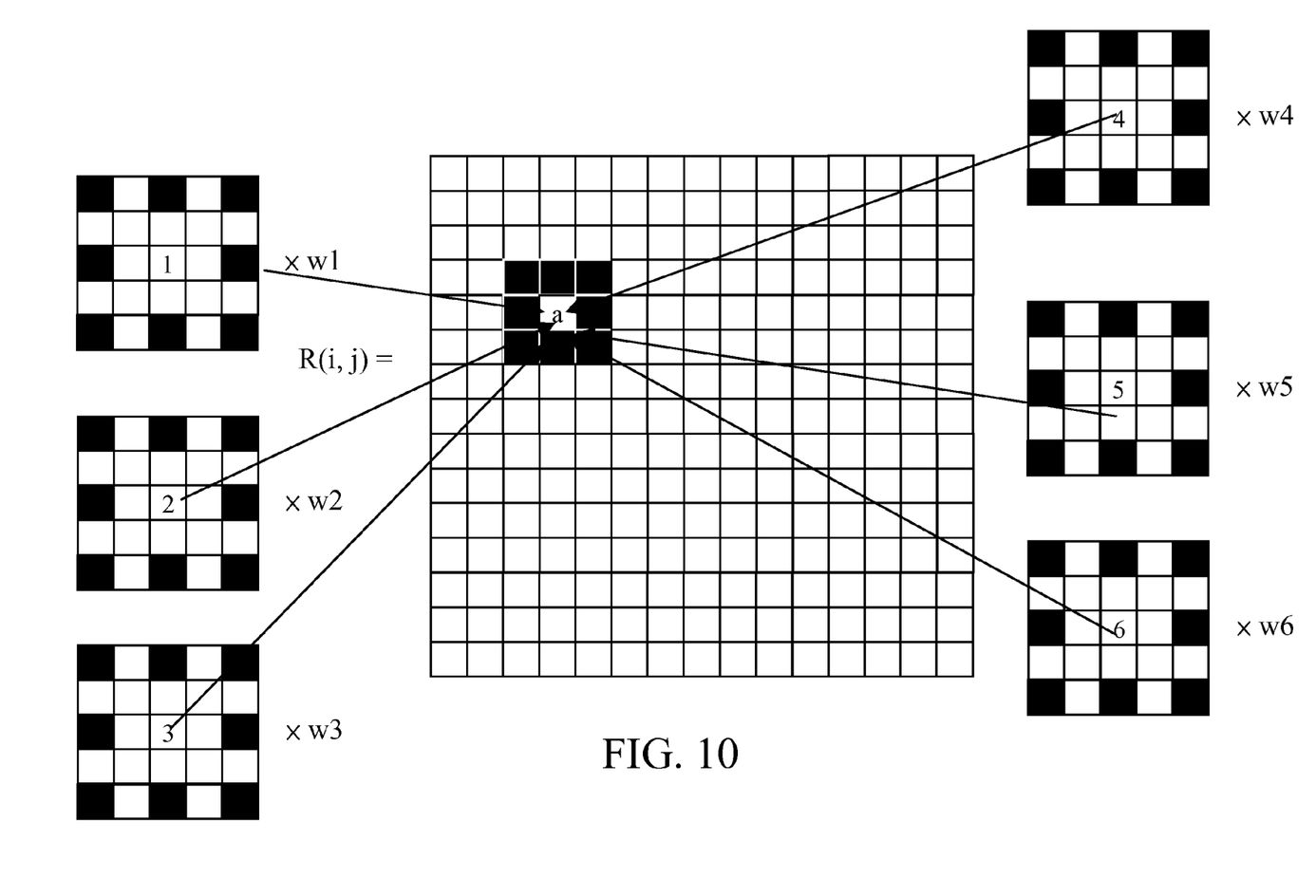
FIG. 10 is a schematic view of patching products obtained by multiplying the patch arrays by the weight values to the target pixel array according to the present invention.

Referring to FIG. 10, in which the conversion module respectively multiplies the patch arrays corresponding to the neighboring pixels 1-6 by the weight values w1-w6 corresponding to the neighboring pixels 1-6, and sequentially patches products to the target pixel array R in a cumulative manner. Each neighboring pixel 1-6 is patched to the target pixel a, and the original pixels n are patched to positions adjacent to the target pixel a. When another pixel is used as a next specified pixel a' for multiplying the patch arrays by the weight values, newly obtained products are continuously patched to the pixels having been patched with the products in a cumulative manner.

Figure 11:
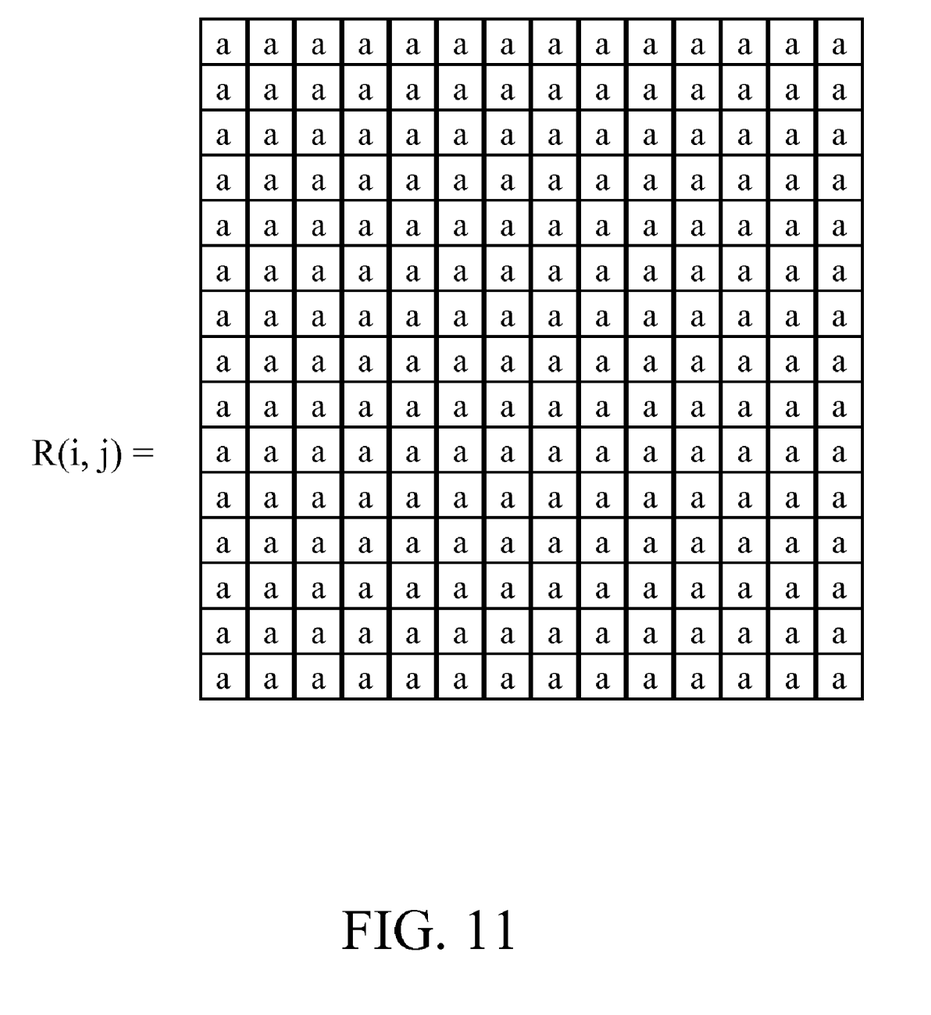
FIG. 11 is a schematic view of the target pixel array after the patching operation is completed according to the present invention.
Figure 12:
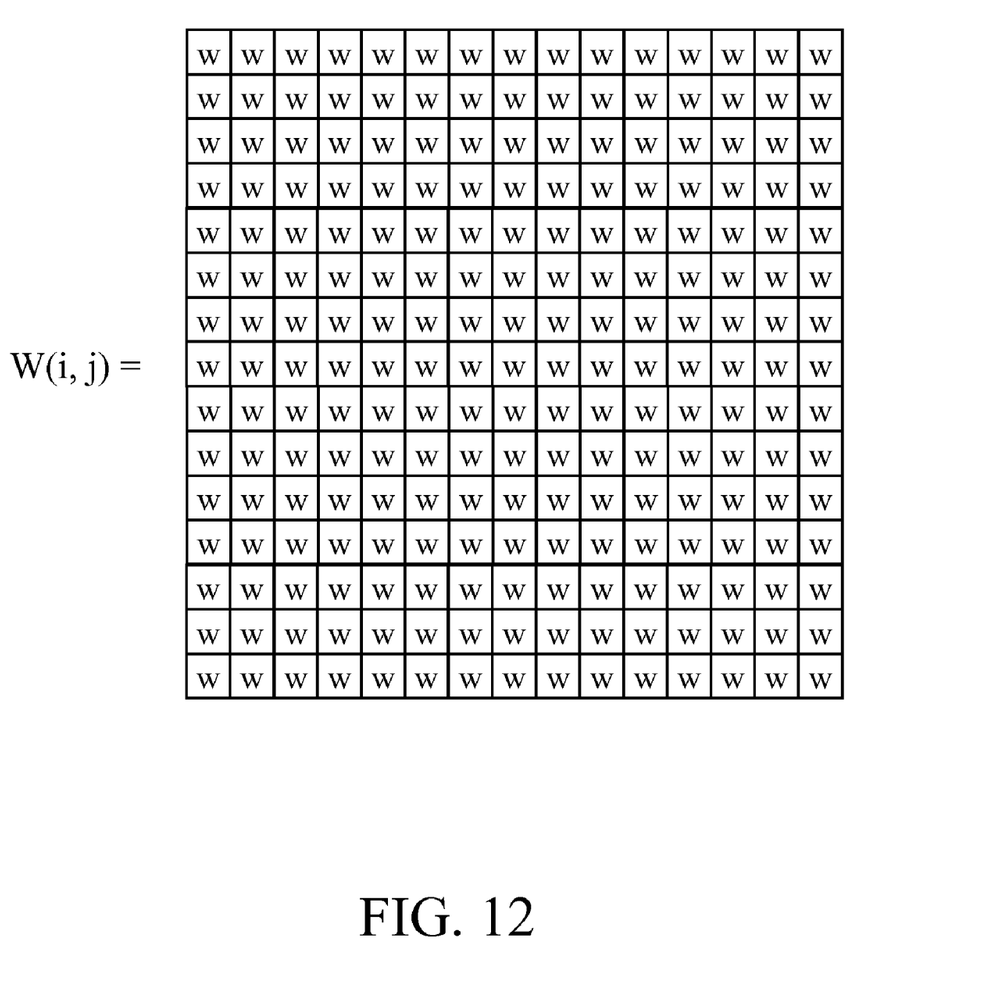
FIG. 12 is a schematic view of the weight array after the patching operation is completed according to the present invention.

Referring to FIGS. 11 and 12, in which for each target pixel a, the conversion module repeatedly performs the above steps, such that results are repeatedly patched to every pixel in the weight array W and the target pixel array R in a cumulative manner as the specified pixel a' changes. After all of the pixels in the enlarged pixel array Xb have been selected as the specified pixels a' for performing patching of the weight array W and patching of the target pixel array R, the patching of the weight array W and patching of the target pixel array R are completed.

Figure 13:
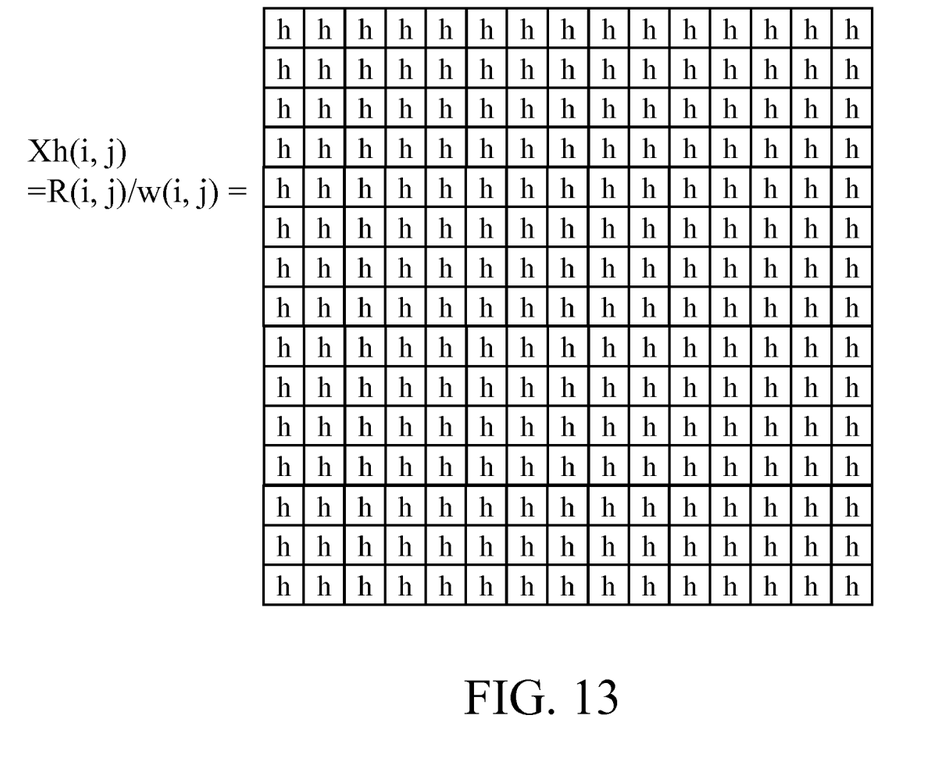
FIG. 13 is a schematic view of replacing original interpolated pixels with an interpolation array according to the present invention.

Referring to FIG. 13, in which the conversion module divides the target pixel array R(i, j) by the weight array W(i, j), so as to obtain a result array Xh(i, j). The result array Xh is used for replacing all the pixels in the enlarged pixel array Xb, and output as the second-resizing image.

Finally, the conversion module reduces the resolution of the second-resizing image by 2-fold by bicubic reduction, thereby forming the expected high-resolution image.

Figure 14:
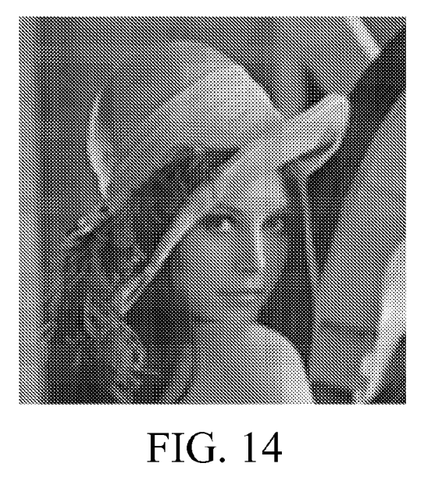
FIG. 14 is an image enlarged by 2-fold by common bicubic interpolation.
Figure 15:
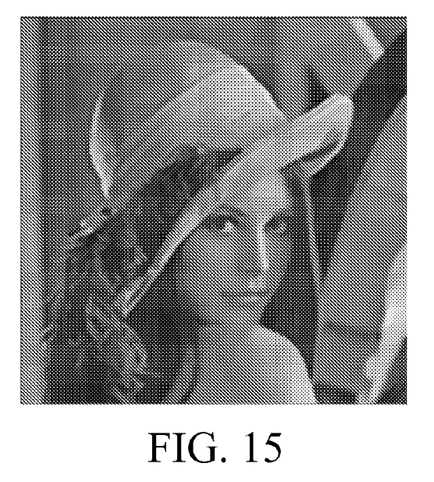
FIG. 15 is an image enlarged by 2-fold by the forward and backward image resizing process of the present invention.

FIG. 14 is an image resized by 2-fold by common bicubic interpolation, and FIG. 15 is an image resized by 2-fold by the forward and backward image resizing process of the present invention. In terms of the sharpness at the image edges, the image resized by the forward and backward image resizing process of the present invention provides a better presentation, and blurring caused by noise is also eliminated.

Figure 16:
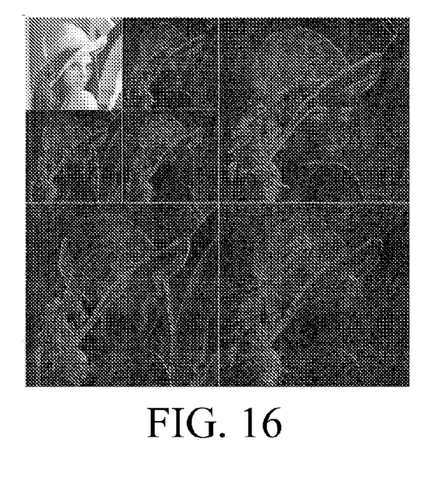
FIG. 16 shows a Haar Transform numerical analysis on the image enlarged by 2-fold by common bicubic interpolation.
Figure 17:
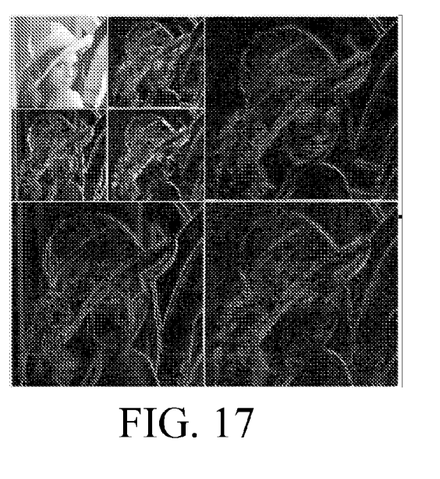
FIG. 17 shows a Haar Transform numerical analysis on the image enlarged by 2-fold by the forward and backward image resizing process of the present invention.

FIG. 16 shows a Haar Transform numerical analysis on the image resized by 2-fold by common bicubic interpolation, and FIG. 17 shows a Haar Transform numerical analysis on the image resized by 2-fold by the forward and backward image resizing process of the present invention. The image resized by 2-fold by the forward and backward image resizing process of the present invention has a high intensity at high-frequency components of Haar Band in the second layer, indicating that the method maintains more image details; and it may be found that at high-frequency components of Haar Band in the first layer, the resizing by 2-fold by the forward and backward image resizing process of the present invention suppresses high-frequency noise.

Figure 18:
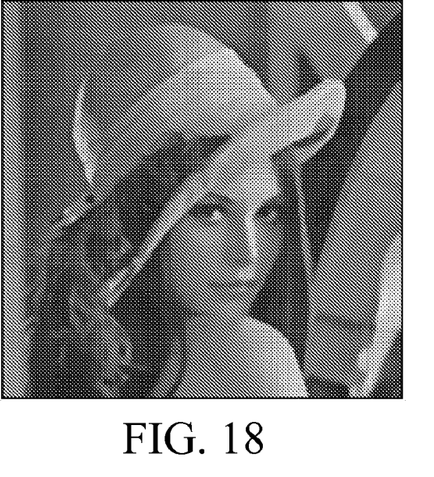
FIG. 18 is an image enlarged by 2-fold by only a non local mean filtering enlargement procedure.
Figure 19:
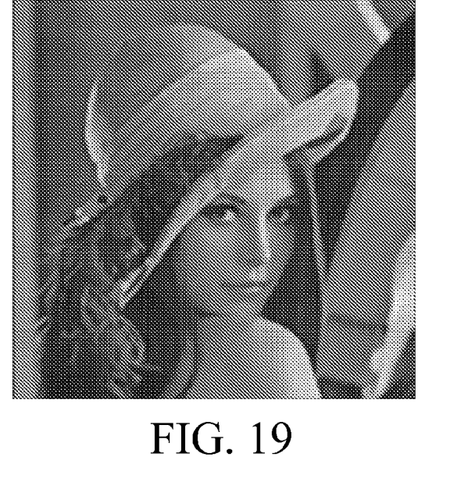
FIG. 19 is an image enlarged by 2-fold by the forward and backward image resizing process of the present invention.

Referring to FIGS. 18 and 19, images resized by performing a part of the steps and performing all the steps are compared. FIG. 18 is an image resized by 2-fold by only a non local mean filtering enlargement procedure, and FIG. 19 is an image resized by 2-fold by the forward and backward image resizing process of the present invention. The difference between the image directly resized by 2-fold by the non local mean filtering enlargement procedure and the image resized by 2-fold by the forward and backward image resizing process lies in that the forward and backward image resizing process maintains more high-frequency information.

Figure 20:
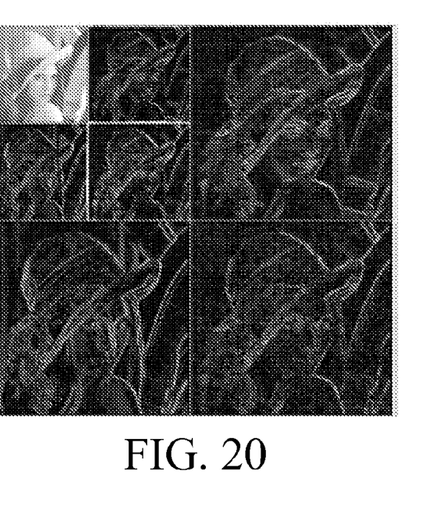
FIG. 20 shows a Haar Transform numerical analysis on the image enlarged by 2-fold by the non local mean filtering enlargement procedure.
Figure 21:
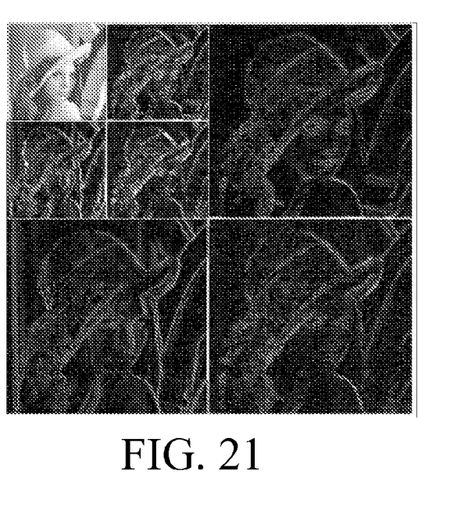
FIG. 21 shows a Haar Transform numerical analysis on the image enlarged by 2-fold by the forward and backward image resizing process of the present invention.

FIG. 20 shows a Haar Transform numerical analysis on the image resized by 2-fold by the non local mean filtering enlargement procedure, and FIG. 21 shows a Haar Transform numerical analysis on the image resized by 2-fold by the forward and backward image resizing process of the present invention. The image resized by 2-fold by the forward and backward image resizing process of the present invention has a high intensity at high-frequency components of Haar Band in the second layer, such that the forward and backward image resizing process can effective enhance important image details.

Figure 22:
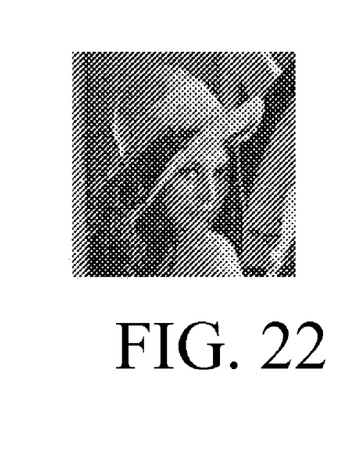
FIG. 22 is an original image having noise.
Figure 23:
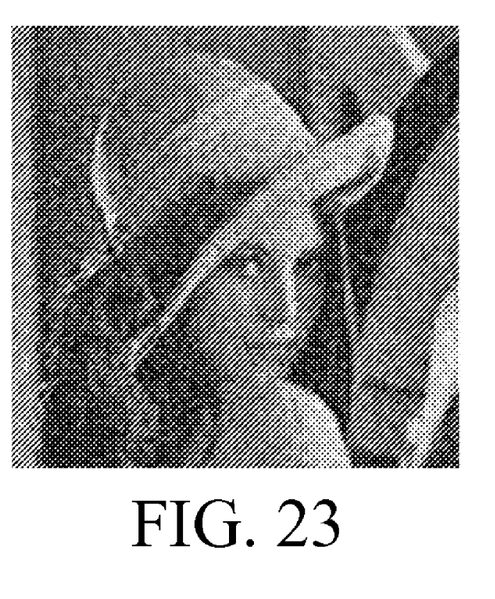
FIG. 23 is an image enlarged by 2-fold by common bicubic interpolation.
Figure 24:
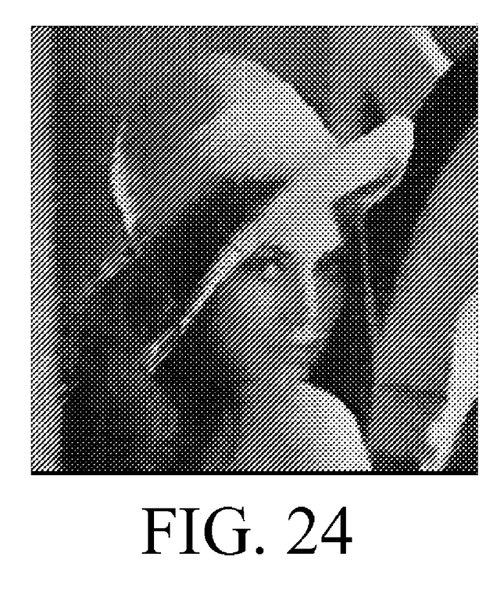
FIG. 24 is an image enlarged by 2-fold by the forward and backward image resizing process of the present invention.

FIG. 22 is an original image having noise, FIG. 23 is an image resized by 2-fold by common bicubic interpolation, and FIG. 24 is an image resized by 2-fold by the forward and backward image resizing process of the present invention. Referring to FIG. 23, in which when an image is resized by 2-fold by common bicubic interpolation, original noise is also directly enlarged, and as a result, the original noise is retained in the image. Referring to FIG. 24, in which since the enlargement by the forward and backward image resizing process contains 2-fold enlargement by the non local mean filtering enlargement procedure and most noise is filtered out, and noise shown in FIG. 24 is significantly less than that shown in FIG. 23.

Figure 25:
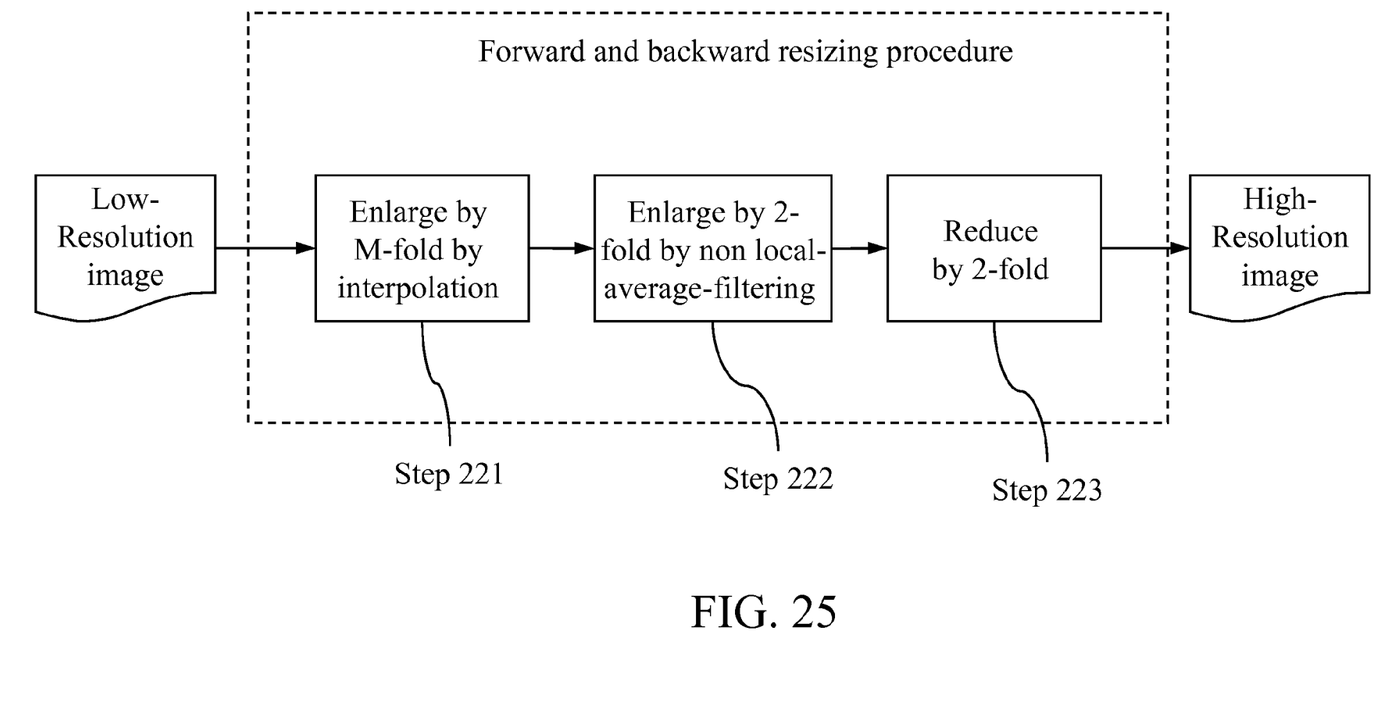
FIG. 25 is a flow chart of a forward and backward image resizing method according to another embodiment of the present invention.

FIG. 25 is a flow chart of a forward and backward image resizing method according to another embodiment of the present invention.

In the forward and backward image resizing method, the low-resolution image is resized into the high-resolution image based on $2^N$, and the image is resized by $2^N$-fold by performing the forward and backward image resizing process for N times. In order to reduce the operation time required by performing forward and backward image resizing for multiple times, in the forward and backward image resizing method of the present invention, forward and backward image resizing may also be performed only once, so as to directly resize the image by an expected fold.

Referring to FIG. 25, in which if the expected fold is M (M is 2 or an integer greater than 2), the conversion module firstly resizes the low-resolution image into a first-resizing image having an M-fold resolution by a common image resizing procedure (Step 221). At this time, if the low-resolution image has noise, the first-resizing image may also have noise.

Next, the conversion module performs the forward and backward image resizing process once. The forward and backward image resizing process is as described above. The conversion module further resizes the resolution of the first-resizing image by 2-fold by a non local mean filtering enlargement procedure, so as to generate a second-resizing image (Step 222).

Finally, the conversion module reduces the second-resizing image by 2-fold by bicubic interpolation or any other interpolation method, that is, the resolution of the image having been resized twice is reduced by ½ of the original resolution of the second-resizing image (Step 223).

Through the above procedures, the original low-resolution image is resized by M-fold to form a high-resolution image to be output.

Since the first-resizing image has been subjected to the forward and backward image resizing process, and the forward and backward image resizing process contains the non local mean filtering enlargement procedure, noise in the low-resolution image is filtered out after the high-resolution image is obtained by enlargement.

In the present invention, the low-resolution image is resized twice, so as to achieve a resolution higher than an expected high-resolution image, thereby generating more details; and then the twice-resized image is reduced into the high-resolution image to be output. In the two image resizing processes and the resolution reduction process, noise in the image is removed while maintaining edge structure; therefore, the present invention can provide good image quality when resizing distorted compressed or streaming images.

The present invention, implemented based on a single image, enhances the image details according to an association between a local area of the image and adjacent areas thereof, independently operates on the single image without additional information, and takes a short operation time. That is, the present invention neither must consider the association between image frames in multiple images to compensate for lost information of a single image frame, nor must the present invention use a large number of training data to patch the high-resolution image, thus effectively reducing the computation effort for image resolution enhancement.

Since the present invention requires a low computation effort, the image resizing method of the present invention can be combined with streaming media player, such that upon receiving consecutive image frames transmitted as streaming media, each image frame is processed in real time and then output, thereby improving the quality of streaming media.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A forward and backward image resizing method, for resizing a low-resolution image into a high-resolution image, the method comprising the steps of:
   obtaining the low-resolution image; and
   performing a forward and backward image resizing process, so as to resizing the low-resolution image into the high-resolution image having an integral multiple resolution, wherein the forward and backward image resizing process comprises:
      increasing the resolution of the low-resolution image by the integral multiple, so as to generate a first-resizing image having the integral multiple resolution;
      further increasing the resolution of the first-resizing image by 2-fold, so as to generate a second-resizing image; and
      reducing the resolution of the second-resizing image by 2-fold, thereby obtaining the high-resolution image.

2. The forward and backward image resizing method as claimed in claim 1, wherein the steps are performed by a conversion module.

3. The forward and backward image resizing method as claimed in claim 2, wherein the conversion module is a data processing apparatus installed with conversion software.

4. The forward and backward image resizing method as claimed in claim 3, wherein the conversion software is integrated with image-media playback software, such that after the low-resolution image is resized into the high-resolution image, the image-media playback software plays back the high-resolution image obtained by resizing the low-resolution image.

5. The forward and backward image resizing method as claimed in claim 1, wherein the integral multiple is 2.

6. The forward and backward image resizing method as claimed in claim 5, further comprising a step of repeatedly performing the forward and backward image resizing process for N times, so as to increase the resolution of the low-resolution image by $2^N$-fold.

7. The forward and backward image resizing method as claimed in claim 1, wherein in the step of reducing the resolution of the second-resizing image by 2-fold, the resolution of the second-resizing image is reduced by bicubic interpolation.

8. The forward and backward image resizing method as claimed in claim 1, wherein the step of generating the second-resizing image comprises:
   defining the first-resizing image as an original pixel array comprising a plurality of original pixels;
   obtaining an enlarged pixel array by enlarging the original pixel array by 2-fold, wherein the enlarged pixel array comprises the original pixels and a plurality of interpolated pixels between the neighboring original pixels; and
   patching the original pixels and the interpolated pixels according to image value differences between the interpolated pixels and the neighboring original pixels, so as to obtain the second-resizing image.

9. The forward and backward image resizing method as claimed in claim 8, wherein in the step of obtaining the enlarged pixel array according to the original pixel array, the original pixel array is calculated by bicubic interpolation, so as to obtain the enlarged pixel array.

10. The forward and backward image resizing method as claimed in claim 8, wherein the step of patching the interpolated pixels comprises the steps of:
    establishing a blank target pixel array and a blank weight array, wherein the target pixel array and the weight array have a same size as the enlarged pixel array;
    defining each pixel in the target pixel array as a target pixel, and defining a search range for each target pixel;
    selecting a target pixel, and finding a specified pixel corresponding to the target pixel from the enlarged pixel array;
    finding original pixels located within the search range for the specified pixel, respectively defining each original pixel as a neighboring pixel, and respectively calculating similarities between each of the neighboring pixels and the target pixel;
    calculating weight values of the neighboring pixels according to the similarities, and patching the weight values to positions in the weight array corresponding to and adjacent to the target pixel in a cumulative manner;
    defining a patch array for each neighboring pixel, wherein the patch array comprises the neighboring pixel in the center, and the original pixels in the original pixel array being adjacent to the neighboring pixel;
    respectively multiplying the patch arrays corresponding to the neighboring pixels by the weight values corresponding to the neighboring pixels, and sequentially patching results to the target pixel array in a cumulative manner, wherein each neighboring pixel is patched to the target pixel, and the original pixels are patched to positions adjacent to the target pixel;
    repeatedly performing the above steps to complete patching of the entire weight array and patching of the entire target pixel array; and
    dividing the target pixel array by the weight array, so as to obtain a result array to be output as the second-resizing image.

11. The forward and backward image resizing method as claimed in claim 10, wherein the similarities are image value differences between the neighboring pixels and the target pixel.

12. The forward and backward image resizing method as claimed in claim 11, wherein each of the weight values is a function of the image value differences.

* * * * *